(12) United States Patent
Horvitz et al.

(10) Patent No.: US 8,788,517 B2
(45) Date of Patent: Jul. 22, 2014

(54) INTELLIGENTLY GUIDING SEARCH BASED ON USER DIALOG

(75) Inventors: Eric J. Horvitz, Kirkland, WA (US); William H. Gates, III, Medina, WA (US); Joshua T. Goodman, Redmond, WA (US); Bradly A. Brunell, Medina, WA (US); Gary W. Flake, Bellevue, WA (US); Oliver Hurst-Hiller, New York, NY (US); Kenneth A. Moss, Mercer Island, WA (US); Raymond E. Ozzie, Manchester, MA (US); John C. Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1018 days.

(21) Appl. No.: 11/427,302

(22) Filed: Jun. 28, 2006

(65) Prior Publication Data

US 2008/0005075 A1  Jan. 3, 2008

(51) Int. Cl.
G06F 7/00 (2006.01)
G06F 17/30 (2006.01)

(52) U.S. Cl.
USPC .......................................................... 707/759

(58) Field of Classification Search
USPC .......................................................... 707/713
See application file for complete search history.

(56) References Cited

U.S. PATENT DOCUMENTS

| | | | |
|---|---|---|---|
| 5,021,989 A | 6/1991 | Fujisawa et al. | |
| 5,051,886 A | 9/1991 | Kawaguchi et al. | |
| 5,493,692 A | 2/1996 | Theimer et al. | |
| 5,519,608 A * | 5/1996 | Kupiec | 704/9 |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,236,987 B1 * | 5/2001 | Horowitz et al. | 1/1 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |

(Continued)

FOREIGN PATENT DOCUMENTS

| | | |
|---|---|---|
| KR | 1020010084093 A | 9/2001 |
| KR | 1020020019079 A | 4/2002 |
| WO | 9800787 | 1/1998 |

OTHER PUBLICATIONS

International Search Report for PCT Application PCT/US2007/014721 dated Dec. 17, 2007. 3 pages.

(Continued)

*Primary Examiner* — Robert Beausoliel, Jr.
*Assistant Examiner* — Michael Pham
(74) *Attorney, Agent, or Firm* — Dan Choi; Carole Boelitz; Micky Minhas

(57) ABSTRACT

Provided is mechanism for guiding computer searches (e.g., web, Internet, intranet . . . ). Machine learning and reasoning mechanisms are employed together with a search engine to facilitate intelligent guidance of queries and results based on a query and responses to computer generated inquires.

Also, disclosed is a mechanism that enables users to validate computer-based information. Users can receive a validity metric associated with computer generated or provided results. Validation systems and methods are disclosed to facilitate determining the results including those that employ humans (e.g., referrals, voting . . . ) and/or automated ways (e.g., source analysis, data mining . . . ).

19 Claims, 19 Drawing Sheets

(56) References Cited

U.S. PATENT DOCUMENTS

| | | | |
|---|---|---|---|
| 6,601,059 B1* | 7/2003 | Fries | 1/1 |
| 6,747,675 B1 | 6/2004 | Abbott et al. | |
| 6,751,611 B2* | 6/2004 | Krupin et al. | 707/3 |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,968,333 B2 | 11/2005 | Abbott et al. | |
| 7,031,961 B2* | 4/2006 | Pitkow et al. | 1/1 |
| 7,444,348 B2* | 10/2008 | Fries et al. | 1/1 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2002/0107842 A1* | 8/2002 | Biebesheimer et al. | 707/3 |
| 2003/0028529 A1 | 2/2003 | Cheung et al. | |
| 2003/0046401 A1 | 3/2003 | Abbott et al. | |
| 2003/0093276 A1* | 5/2003 | Miller et al. | 704/257 |
| 2003/0154476 A1 | 8/2003 | Abbott, III et al. | |
| 2003/0172075 A1* | 9/2003 | Reisman | 707/10 |
| 2003/0182276 A1* | 9/2003 | Bossman et al. | 707/3 |
| 2004/0049499 A1* | 3/2004 | Nomoto et al. | 707/3 |
| 2004/0059729 A1* | 3/2004 | Krupin et al. | 707/3 |
| 2005/0033711 A1* | 2/2005 | Horvitz et al. | 706/50 |
| 2005/0034078 A1 | 2/2005 | Abbott et al. | |
| 2005/0108200 A1 | 5/2005 | Meik et al. | |
| 2005/0125390 A1* | 6/2005 | Hurst-Hiller et al. | 707/3 |
| 2005/0131872 A1* | 6/2005 | Calbucci et al. | 707/3 |
| 2005/0182783 A1* | 8/2005 | Vadai et al. | 707/102 |
| 2005/0203878 A1 | 9/2005 | Brill et al. | |
| 2006/0085255 A1 | 4/2006 | Hastings et al. | |
| 2007/0050353 A1* | 3/2007 | Ekberg et al. | 707/5 |

OTHER PUBLICATIONS

OA Dated Feb. 19, 2009 for U.S. Appl. No. 11/427,317, 29 pages.

Translated of the Chinese Office Action mailed Aug. 8, 2011 for Chinese patent applictaion No. 200780024382.X, a counterpart foreign application of U.S. Appl. No. 11/427,302, 8 pages, reviewed translation only.

Office Action for U.S. Appl. No. 11/427,317, mailed on Jul. 19, 2011,17 pages.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on The Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminatiiong Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

Translated of the Korean Office Action mailed Jul. 22, 2013 for Korean patent applictaion No. 10-2008-7030985, a counterpart foreign application of US patent application No. 11/427,302, 7 pages, Only english portion was considered.

Korean Office Action mailed Feb. 28, 2014 for Korean patent application No. 10-2008-7030985, a counterpart foreign application of U.S. Appl. No. 11/427,302, 9 pages.

* cited by examiner

US 8,788,517 B2

INTELLIGENTLY GUIDING SEARCH BASED ON USER DIALOG

CROSS-REFERENCE TO RELATED APPLICATIONS

This application is related to U.S. application Ser. No. 11/427,317, filed Jun. 28, 2006 and entitled "VALIDATION OF COMPUTER RESPONSES." The entirety of this application is incorporated by reference.

BACKGROUND

Advancements in networking and computing technologies have enabled transformation of computers from low performance/high cost devices that perform basic word processing and compute low-level mathematical computations to high performance/low cost machines capable of a myriad of disparate functions. For example, a consumer-level computing device can be employed to aid a user in paying bills, tracking expenses, communicating nearly instantaneously with friends or family across large distances by way of email or instant messaging, obtaining information from networked data repositories, and numerous other functions/activities. In business, computers can facilitate communication, control and monitoring of machines, storage, retrieval and analysis of data, among other things. Computers and peripherals associated therewith have thus become a staple in modern society, utilized for both personal and enterprise activities.

The Internet and the World Wide Web continue to expand rapidly with respect to both volume of information and number of users. The Internet is a collection of interconnected computer networks. The World Wide Web, or simply the web, is a service that connects numerous Internet accessible sites via hyperlinks and Uniform Resource Locators (URLs). As a whole, the web provides a global space for accumulation, exchange and dissemination of all types of information. For instance, information is provided by way of online newspapers, magazines, advertisements, books, pictures, audio, video and the like. In addition to providing traditional information, the web further provides easy access to data that previously was practically unavailable due to laborious steps required to access the information (e.g., legal, banking, governmental and educational information). Furthermore, information is also supplied by individuals via personal web pages, message boards, blogs and collaborative works (e.g., Wikipedia, Reference dot com, answers dot com . . . ).

The increase in usage is largely driven by the ever-growing amount of available information pertinent to user needs. By way of example, the web and Internet was initially utilized solely by researches to exchange information. At present, people utilize the web to manage bank accounts, complete taxes, view product information, sell and purchase products, download music, take classes, research topics, and find directions, among other things. Usage will continue to flourish as additional relevant information becomes available over the web.

To maximize likelihood of locating relevant information amongst an abundance of data, search engines are often employed over the web. A web search engine, or simply a search engine, is a tool that facilitates web navigation based on entry of a search query comprising one or more keywords. Upon receipt of a query, the search engine retrieves a list of websites, typically ranked based on relevance to the query. A user can thereafter scroll through a plurality of returned sites to attempt to determine if the sites are related to the interests of the user. However, this can be an extremely time-consuming and frustrating process as search engines can return a substantial number of sites. More often then not, the user is forced to narrow the search iteratively by altering and/or adding keywords to obtain the identity of websites including relevant information.

Regardless of whether information is provided or generated by a computer (e.g. search engine, data analysis . . . ), there still exists a relative level of distrust of such information. This distrust stems from a number of factors such as the general newness as well as a lack of understanding of computing technology and/or underlying software (e.g., black box). The vulnerability of computers and computer programs to bugs, glitches, viruses and the like also contributes to that same distrust. Still further yet, the fact that the web provides a public forum for posting anything a user wishes regardless of its veracity also factors into the trustworthiness of information residing thereon. As a result, users are often quite skeptical of computer generated and/or provided information and are therefore unable to make full and efficient use of that which is provided.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, embodiments described herein pertain to confirming accuracy or veracity of information provided in connection with computer generated and/or provided data (e.g., search results, postings, blogs, news feeds . . . ) in order to increase probability of providing reliable information. The accuracy of information received can be increased or confirmed through a variety of manners. For example, searches can be guided as a function of known and reliable information sources, and/or referrals can be employed to validate information, among other things. As a result, users can gain an increased level of confidence as to validity of information.

According to one particular embodiment, individuals can be polled such that computer-based information including answers or results is supplied or otherwise identified to a group of users and votes are received pertaining to veracity of the information. By way of example and not limitation, the information can be provided and votes received from within a social network forum, blog, instant messaging session and the like.

Information can also be validated without direct input from other individuals in accordance with another aspect of the subject innovation. More specifically, systems and methods are provided that can scrutinize information sources, for example by comparing results with other like data to detect similarities or contradictions or measuring a distance from a set of known reliable sources. Machine learning based approaches can also be employed to facilitate identifying information veracity.

According to still another aspect of the subject innovation, computer searches (e.g., web search, Internet search, intranet search . . . ) can be guided by inference to facilitate identification of pertinent information. More specifically, a learning and reasoning system can be used to facilitate converging on reliable subject matter based in part upon queries and responses to inquiries by the system.

Moreover, information can be gathered from the user directly or can be requested in an automated way (e.g., with confirmation per a user's policy for sharing data) from the user's system or other database of data.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
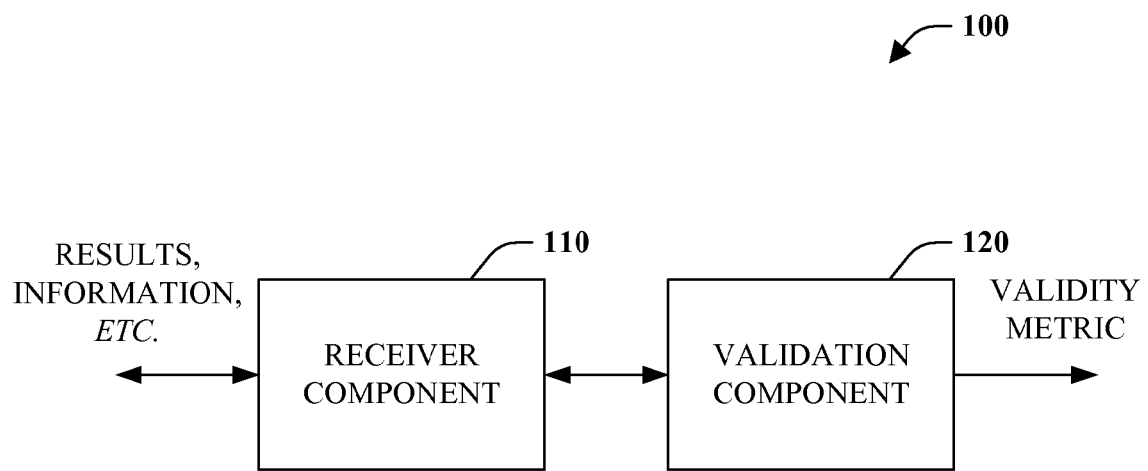
FIG. 1 is a block diagram of a validation system.

Referring initially to FIG. 1, a validation system 100 is illustrated in accordance with an embodiment of the subject innovation. Although computers are very good at providing useful information, there exists a relative level of distrust of computer-based information. The validation system 100 facilitates determining veracity of computer generated and/or provided information. Based on this information, a user can decide whether or not and/or to what extent he/she should rely on the computer results. The system 100 includes a receiver component 110 and validation component 120. The receiver component 110 can receive, retrieve, or otherwise obtain or acquire computer provided results and information pertaining to the results. By way of example, if a computer is utilized to analyze an electrocardiogram (EKG) the receiver component 110 can receive the EKG and the result of the analysis (e.g., normal, myocardial infarction . . . ). In an alternative instance, the result could correspond to a webpage and the information can be resident within the webpage as well as the query itself. The result and associated information can be supplied to or made available for access by the validation component 120.

The validation component 120 receives or retrieves the information from the receiver component 110, and can facilitate determining validity of the result or answer. In the first example, the determination would correspond to whether or not the analysis result is accurate given the EKG. In the second example, the validity of the information provided on the webpage can be assessed. This determination can be made in a myriad of different manners for example the validity component 120 can map results or result information to known information and/or request and receive outside information as discussed further infra. More specifically, the validation component 120 can generate a validity metric indicative of the veracity of the result. In one instance, this can be a binary value indicating whether the results are correct or incorrect, true or false or the like. Alternatively, the metric can be multi-valued for instance in accordance with the following exemplary table.

TABLE 1

| Validity Metric | Meaning |
| --- | --- |
| 0 | Unknown/Undeterminable |
| 1 | True |
| 2 | Probably true |
| 3 | Probably False |
| 4 | False |

It should also be appreciated that in addition to providing a validity metric or score, the validation component 120 can also identify how/why such a score was produced. This information can facilitate providing an explanation so that users need not blindly trust the validity score. For instance, it could be noted that a particular web page received as score of "3" (Probably false) because based on a comparison with other web pages providing such information there was a lack of correlation or similarity of facts. By way of example, an interface or application can provide a link to an explanation next to the metric so that users can easily access the information while the display is not cluttered with such data.

Figure 2:
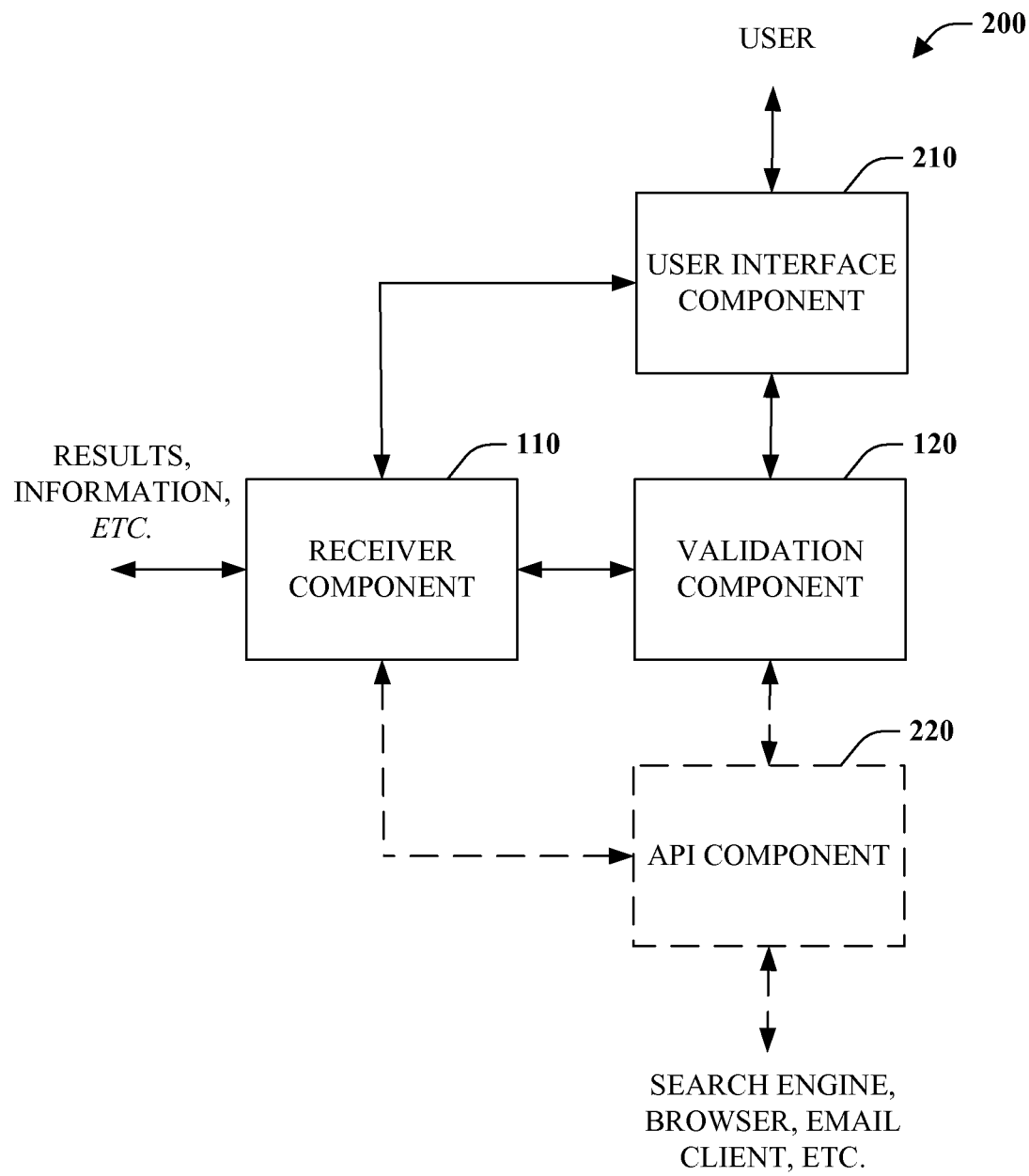
FIG. 2 is a block diagram of a validation system that includes an interface.

In FIG. 2, validation system 200 is depicted in accordance with an aspect of the subject innovation. Similar to system 100 of FIG. 1, system 200 includes the receiver component 110 and the validation component 120. In brief, the receiver component 110 can acquire results and information associated therewith and provide or make such data accessible to the validation component 120. The validation component 120 can then facilitate scrutinizing the result and generating a metric that identifies whether the result is correct, incorrect or somewhere in between. In addition to these components, system 200 includes a user interface component 210 communicatively coupled to both the receiver component 110 and the validation component 120. The user interface component 210 enables a user to interact with the process of validating computer results. For example, the component 210 can display computer results and associated information to a user. The user can subsequently initiate validation and/or receive the validity metric from interface component 210 via validation component 120. Further, a user can also utilize the user interface to specify a target validity range.

By way of example, a user may view displayed computer results, perhaps associated with a web search, with user interface component 210. The user may then decide whether or not they desire to validate the information and if so to what extent. If the user is merely surfing the web for trivial data they may not wish to validate the information being supplied. However, if the user is going to rely on the information in some manner, then they may wish to validate. Likewise, depending on the degree of reliance, a user can instruct the validation component 120 to check to ensure that the result is absolutely true, probably or likely true or false or some particular veracity value. Such determination may depend on cost in terms of latency and/or money, among other things, as it may be more costly to verify that the result is one-hundred percent true or false as opposed to probably true or false, for instance.

As those of skill in the art will recognized upon reading this detailed description, the user interface component 210 can be manifested in a plurality of different forms to facilitate interaction with data. For example, the user interface component 210 can include one or more disparate regions and display a number of graphical objects on a screen whether personal computer, PDA, mobile telephone, or other suitable device, for example) such as text, graphics, audio, video, buttons, menus and text boxes, among other things. It will be appreciated that other layouts or orientations exist all of which are intended to fall within the scope of the appended claims.

Additionally or alternatively, system 200 can include an application programming interface (API) component 220. API component 220 provides a mechanism to enable use of system 200 by other applications and systems rather than as a stand-alone system. In accordance with on aspect of the innovation, the API component can facilitate interaction with a search engine. In such an instance, the search engine can provide web pages and/or receive validity scores. The search engine can for instance augment result rankings based on validity scores. For example, assuming the same relevancy score a web page with a higher validity score can be ranked higher than a web page with a lower score. The search engine can also display veracity information with search engine results to allow users to decide which results they would like to view based on this information. Further yet, a user can specify a threshold and the search engine can return only results that satisfy the threshold. As an alternative or in addition, a browser, browser toolbar, email client or instant message client can interact with system 200 via API component 220. In application, the browser can proactively warn or otherwise notify users when they visit web pages with poor veracity.

Figure 3:
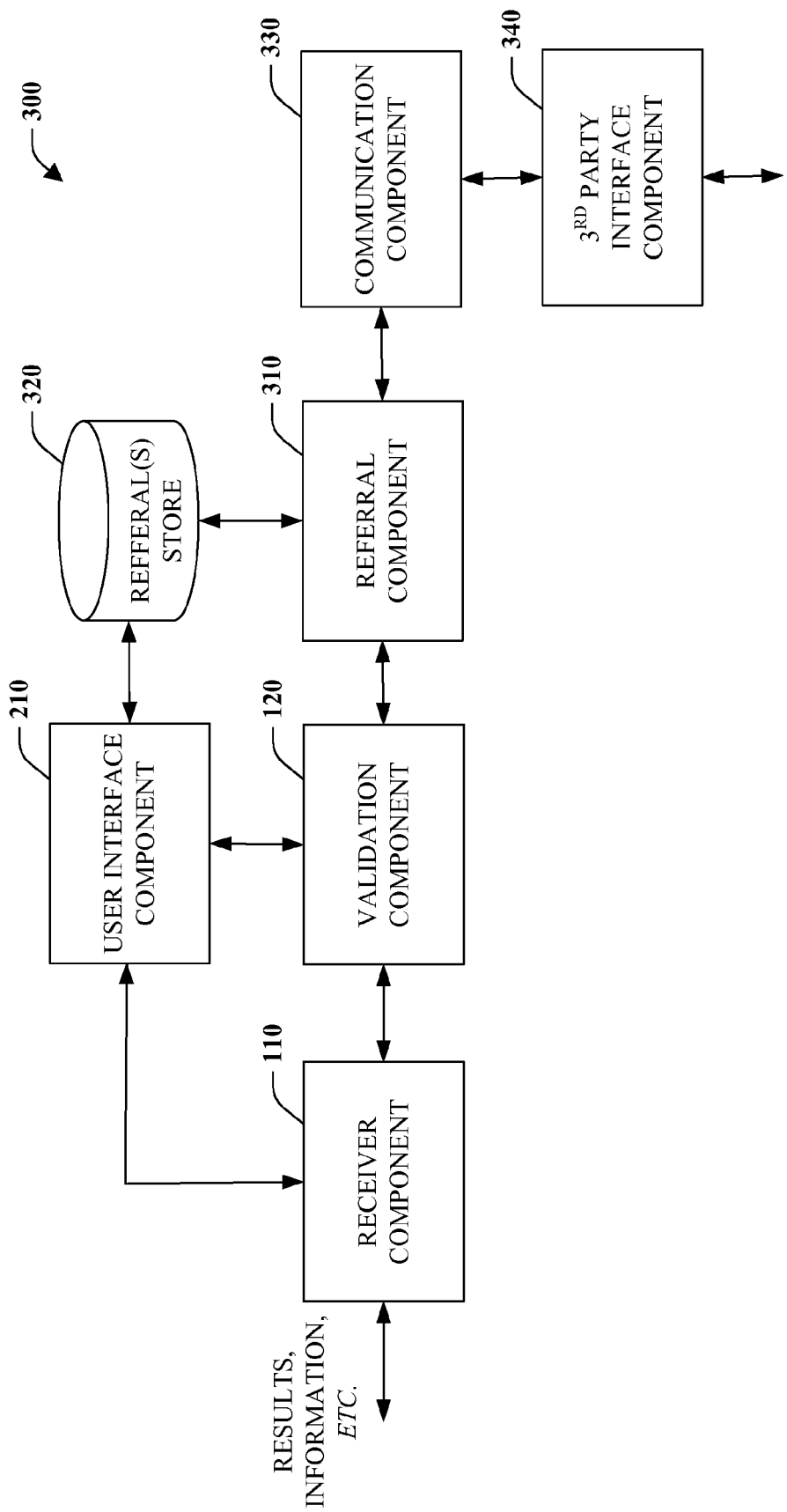
FIG. 3 is a block diagram of a referral based validation system.

FIG. 3 illustrates a referral validation system 300 in accordance with an aspect of the subject innovation. The system 300 includes receiver component 110, validation component 120 and interface component 210, as previously described. In brief, the receiver component 120 acquires computer provided results and/or information associated therewith and supplies it to validation component 120. The validation component 120 can generate a metric identifying the veracity of the result and provide the metric to a user alone or conjunction with the results and associated information via interface component 210.

System 300 also includes a referral component 310 communicatively coupled to the validation component 310, referral(s) store 320 and communication component 330. The validation component 120 can employ the referral component 310 to retrieve an opinion from one or more individuals (viz., human beings). Based on the result or answer, the referral component 310 can search the referral(s) store 320 to locate an appropriate individual to verify the answer. It is to be noted that user interface component 210 is coupled to the referral(s) store 320 and can thus facilitate addition and/or removal of referrals and otherwise effect selection by the referral component 310. For example, a user can identify a first individual to verify certain results or facts and second individual to verify other facts. Further yet, the user can specify a set of prioritized individuals to verify particular results such that if the first individual is not available the referral component 310 can facilitate contact of a second individual and so forth.

The communication component 330 is communicatively coupled to the referral component 310. The communication component 330 receives, retrieves or otherwise obtains referral and result information from the referral component 310. The referral information can include identity of an individual (e.g. real name, user name . . . ) and one or more contact methods. The result information can include data pertaining to a computer provided result and optionally the result itself. The communication component 330 is operable to establish an Internet communication session with one or more referrals. The communication session can be established in the context of social networks, blogs, instant messaging, email, VoIP (Voice over Internet Protocol), among others. Once established the communication session can be utilized to transfer result information and/or results to a referral and receive a response.

The communication component is also coupled to the third party interface component 340. Interface component 340 can provide an environment to aid referrals in viewing and responding to obtained result information. In one instance, the interface component 340 can correspond to a rich graphical user interface. The user can obtain result and result information via the interface component 340. Subsequently or concurrently, the third-party user can analyze the results to determine if the result is correct. The user can also employ the user interface to initiate communication with others, for example to consult. Furthermore, it should be appreciated that the result may not be provided to the user so as not to bias the response. Instead, the user will simply provide a response.

Assume, for example, a user (e.g., technician) has a pap smear analyzed by a computer and it determines that there is a high likelihood of pre-cancerous cells in the smear. The user may also agree with the computer-based findings but would also like the opinion of a second technician or doctor. The system can automatically package information relating to the diagnosis (e.g. image of the smear, conclusion (which could be exposed to the second person after receiving his/her input so as not to bias the second diagnosis), provide it to a second person, and receive a response. It should be noted that the second person could even be located across the globe (e.g., India) to reduce costs but enhance medical treatment by providing a second opinion that conventionally would be too cost-prohibitive if performed by a second U.S. doctor.

Figure 4:
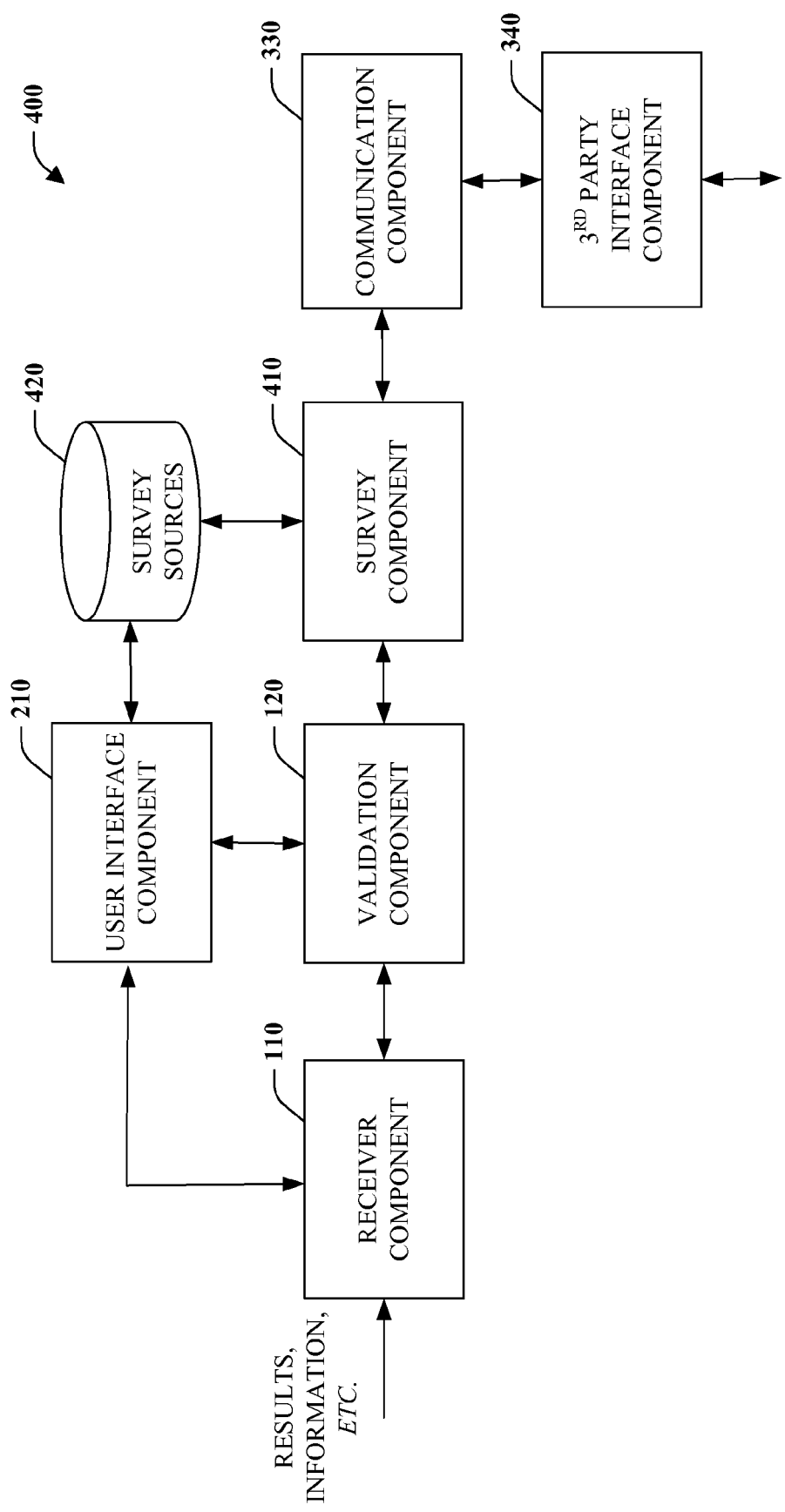
FIG. 4 is a block diagram of a survey based validation system.

Turning attention to FIG. 4, a survey validation system 400 is illustrated in accordance with an aspect of the innovation. Similar to systems 200 and 300, system 400 includes the receiver component 110, validation component 120, and the user interface component 210, as previously described. Briefly summarized, the receiver component 110 can obtain results, result information and the like and provide or make it accessible to validation component 120. The user interface component 210 is communicatively coupled to the receiver component 110 and validation component 120 and provides a mechanism for interacting with the system 400 by, among other things, controlling how the validation component 120 validates data.

System 400 also includes a survey component 410 communicatively coupled to validation component 120. The survey component 410 facilitates identifying appropriate survey sources and providing survey input back to validation component 120. More specifically, the survey source can be identified from the survey source(s) store 420. The store(s) 420 houses a plurality of sources such as individuals and electronic forums, among other things. These sources can be but are not limited to being identified and stored by a user via the communicatively coupled user interface component 210. Based on the result and/or result information, the survey component 410 can select one or more survey sources from store 420, and provide or make them accessible to communication component 330. The communication component 330 can then establish a communication session for receipt of survey results.

By way of example and not limitation, the communication component 330 can establish a central web site to receive votes regarding the veracity of the results given result information and send out emails to particular individuals that direct them to the site for voting. Alternatively, a group can be set up with respect to a social network to receive votes. Users can employ a third-party user interface component to view a result and result information, and enable voting. For example, the interface component 340 can display the voting web site. Once results are received, they can be communicated back through the third party interface component 340, the communication component 330 and survey component 410 to the validation component 120. Based on the voting results, the validation component 120 can determine the veracity of the results and generate a metric to provide back to a user via the user interface component 210.

Figure 5:
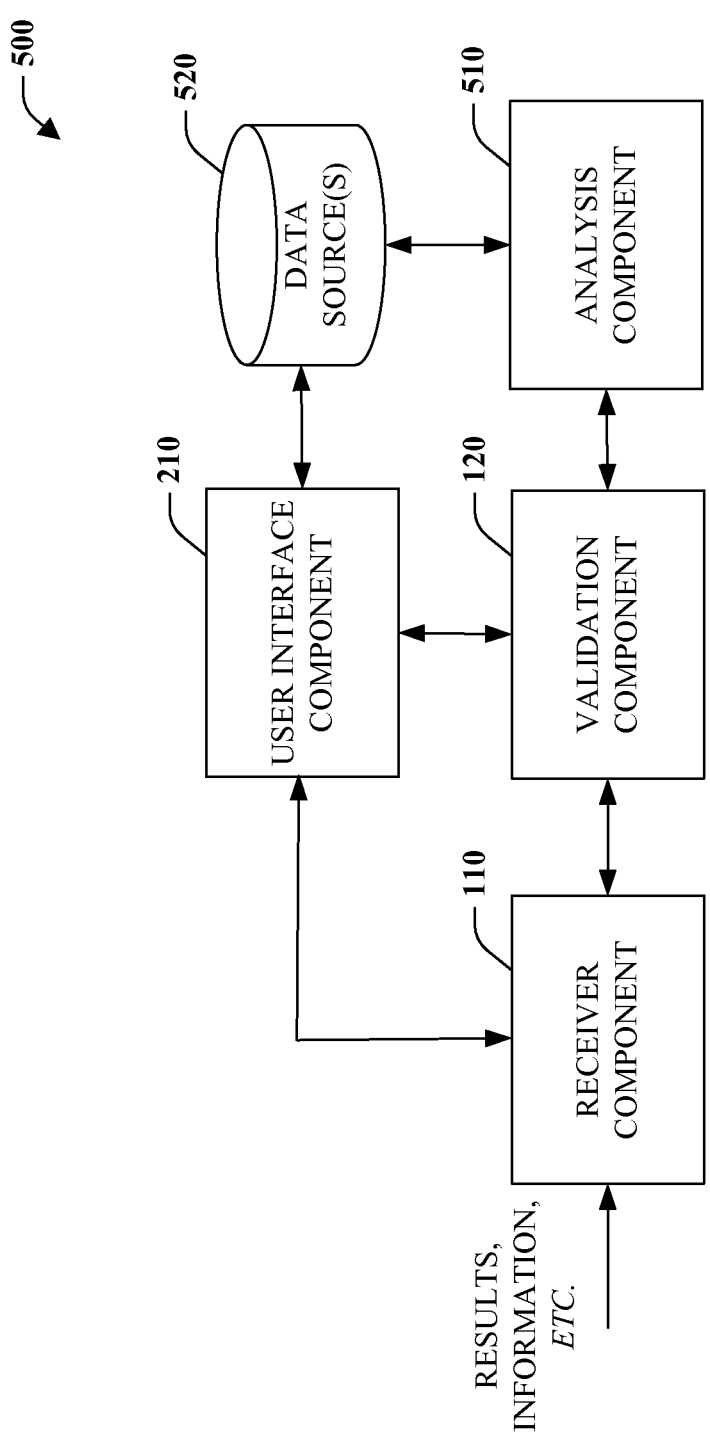
FIG. 5 is a block diagram of an analysis based validation system.

Referring to FIG. 5, an analysis based validation system 500 is illustrated in accordance with an aspect of the subject innovation. Similar to systems 200, 300 and 400, system 500 includes the receiver component 110, the validation component 120 and the user interface component 210, as described supra. Furthermore, the system 500 includes an analysis component 510 and data source(s) 520 communicatively coupled together and to validation component 120 and user interface component 210, respectively. Upon request by the validation component 120, the analysis component 510 can scrutinize results in light of various data sources. Data source(s) 520 can house the identities and/or data of known or user identified trusted data sources. Among other things, these sources can include particular websites, online books or other publications.

For instance, a user can identify a plurality of websites that they believe are reliable and store those identities in data source store 520. Subsequently, they can initiate validation of results. Validation component 120 can then request data from analysis component 510. The analysis component 510 can then analyze the results as well as other relevant information with respect to information provided by one or more data sources 520. Results of the analysis can then be provided back to the validation component 120. For example, if website data is being validated against other data on the web, the analysis component 120 could indicate that four out of five trusted data sources concur/disagree with the results. Based on this information, the validation component 120 can generate a validation metric to provide to the user via user interface component 210.

Figure 6:
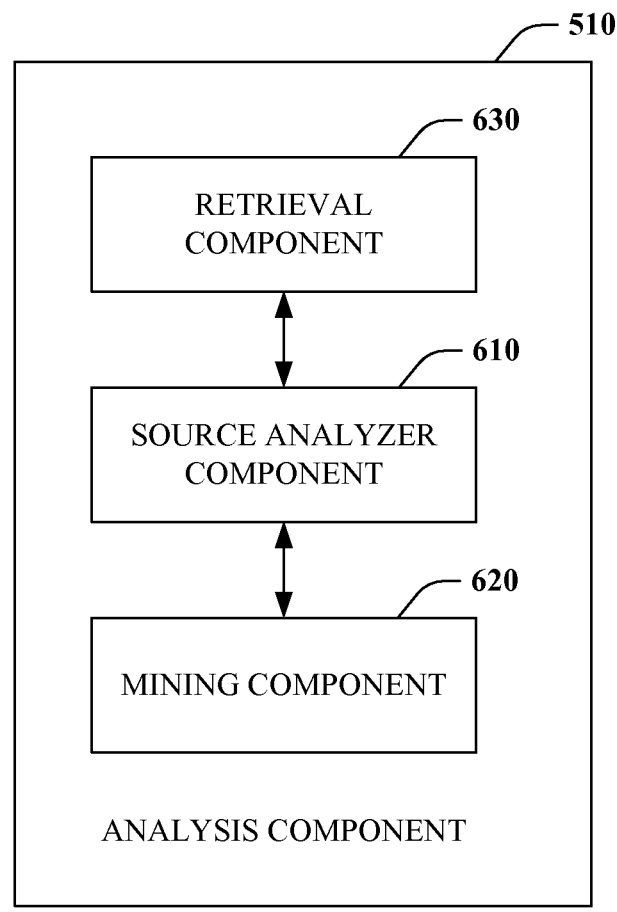
FIG. 6 is a block diagram of an analysis component.

FIG. 6 illustrates an analysis component 510 in further detail in accordance with an aspect of the subject innovation. The component 510 includes source analyzer component 610 that compares computer provided results with data sources to determine if the results are accurate. In addition, the analyzer component 610 is communicatively coupled to the mining component 620. The mining component 620 provides the analyzer component 610 with data sources to scrutinize. More particularly, mining component 620 can utilize a result and/or information pertaining to the result to match or identify pertinent data sources, for example by examining metadata associated therewith. Relevant sources can then be identified to the analyzer component 610. The analyzer component 610 can provide the data source identities to source retrieval component 630, which can subsequently or concurrently locate and return the information to the analyzer component 610 for analysis.

Analyzer component 620 can also utilize a variety of other techniques to facilitate determination of veracity. For example, the analyzer component 620 can compare one or more documents. The analyzer component 620 can also analyze a relational distance between a source of the information and known reliable sources to the validation component. For instance, a web page that includes a number of links to known reliable sources may be more trustworthy than one that does not. Additionally or alternatively, various machine-learning techniques can be employed to infer veracity from a variety of factors.

Figure 7:
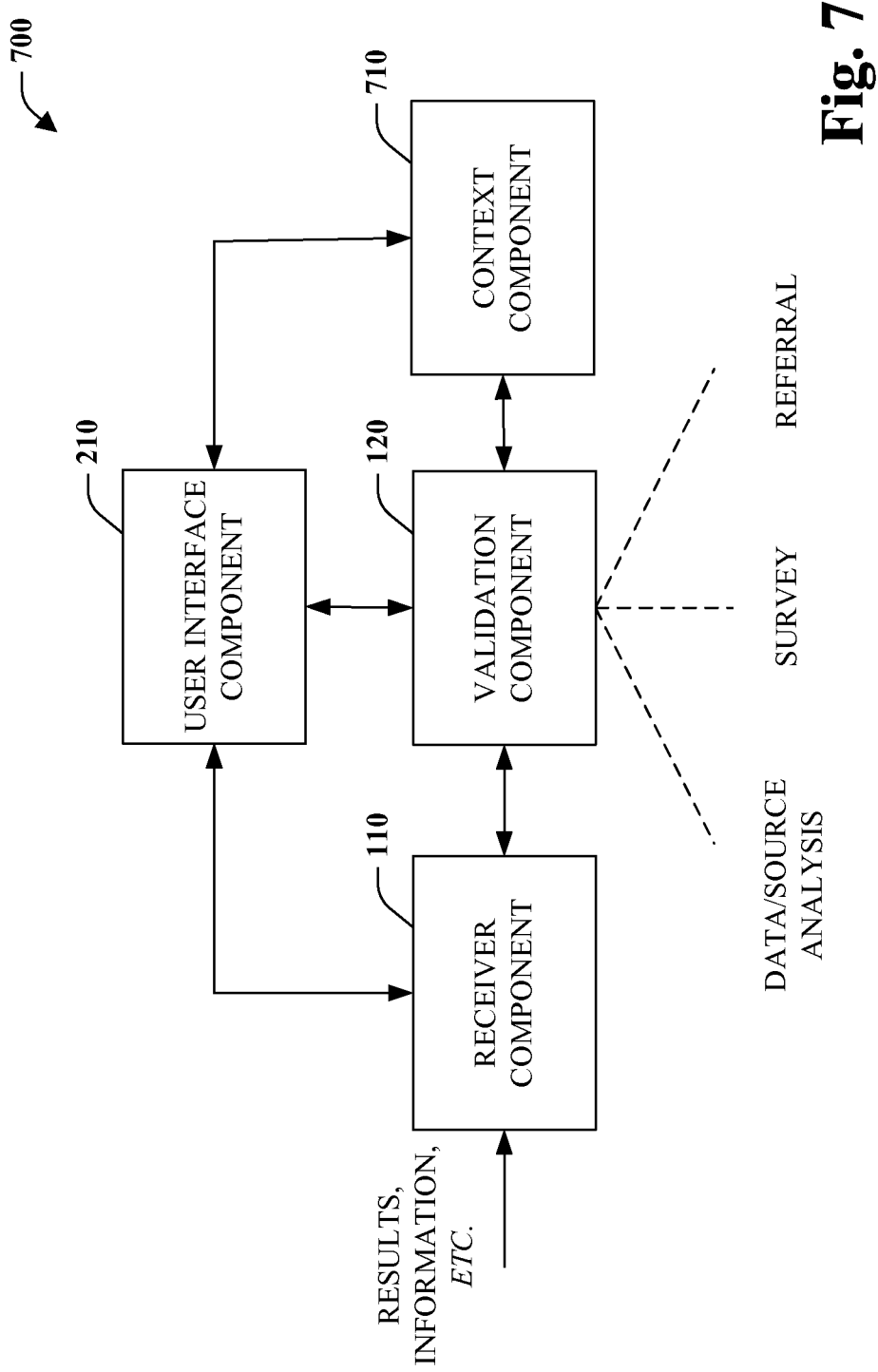
FIG. 7 is a block diagram of a validation system that employs context to identify a validation mechanism.

Referring to FIG. 7, a computer result validation system 700 is illustrated in accordance with an aspect of the innovation. Similar to some systems supra, the system 700 includes receiver component 110, validation component 120 and user interface component 210. As previously described, the receiver component 110 receives or retrieves results, result information and/or the like and makes it available to the user interface component 210 as well as the validation component 120. The user interface component 210 can be employed to initiate result validation via the validation component 120 results of which are provided back to the user through the interface component 120.

It is to be noted that a validation system 700 can employ various mechanisms to facilitate a veracity determination. For example, the system can employ one or more of the referral, survey and data source analysis as described with respect to FIGS. 3, 4 and 5. To facilitate such a choice, context component 710 is provided. The context component 710 is communicatively coupled to both the user interface component 210 and the validation component 120. The context component 710 can identify or determine information about the user, circumstances surrounding the user, results and/or result information that are useful in determining a level of desired validation. This information can be associated with a user and provided by the user interface component 210. The information can include user profile information such as name, age, gender, ethnicity, birthday, favorite web sites, etc. and can be supplied by the user or determine by the interface 210, for example by monitoring interaction (e.g., via cookies . . . ). Additional context information can also be determined or inferred such as time of day, day of week, events (e.g., holidays, expos . . . ) and the like. Based on this information, the validation component 120 can determine the best approach for validation. For example, if time is of the essence, then the validation component 120 may select to validate data utilizing data source analysis. In another instance, the survey or voting mechanism can be determined to be the best validation mechanism for a given result given time, accuracy and cost requirements. Alternatively, if accuracy is important, for instance with respect to medical matters, the validation component can select to employ the referral. Additionally or alternatively, the validation component 120 may chose to utilize all mechanisms at its disposal to determine veracity. In such a scenario, the various mechanisms may be weighted given their reliability, for example weighting referral opinions higher than data analysis.

Figure 8:
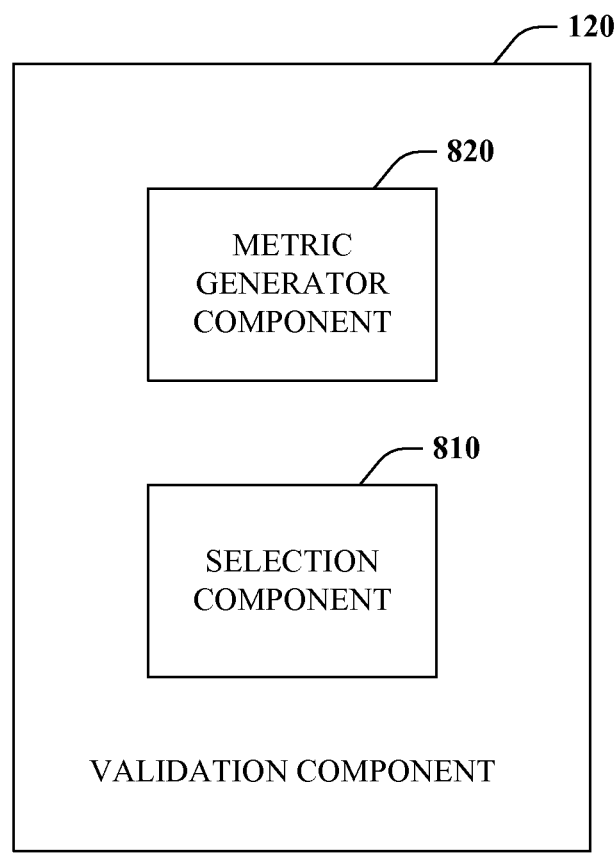
FIG. 8 is a block diagram of a validation component.

FIG. 8 depicts a validation component 120 in accordance with an aspect of the subject innovation. In brief, the validation component 120 facilitates validation of the veracity of computer generated or provided data. The validation component can include selection component 810 that identifies one or more validation mechanisms to employ to validate results or answers. As previously disclosed, a myriad of mechanisms can be utilized including but not limited to referral, survey and data analysis mechanisms. Based at least in part on the subject matter to be validated and other context information, the selection component 810 can determine at least one mechanism to employ.

By way of example, assume that a user searches the web and receives directions to a convention center for an upcoming concert. While accurate directions are desired, they are not crucial. Accordingly, the selection component may eliminate a referral mechanism, especially if it is costly and results cannot be obtained in a timely manner. As a result, the selection component 810 may choose to use one or both of data analysis and survey mechanisms. As per the data analysis mechanism, data sources, such as websites, can be located that are likely to include direction information such as a website associated with the venue, the band, and/or a ticket agency. Such data can be analyzed with respect to the result directions to determine their accuracy. The survey mechanism can also be employed to post the directions in one or more relevant chat rooms, for example, and receive votes as to whether the directions are accurate.

The validation component 120 also includes a metric generation component 820 that facilitates expression of the veracity of a result. Based on the results provided by one or more selected, the metric generation component 820 can produces a meaningful representation of veracity of the result. For instance, the metric can be a Boolean true or false or a scalar value indicating the likelihood that something is correct or incorrect.

Figure 9:
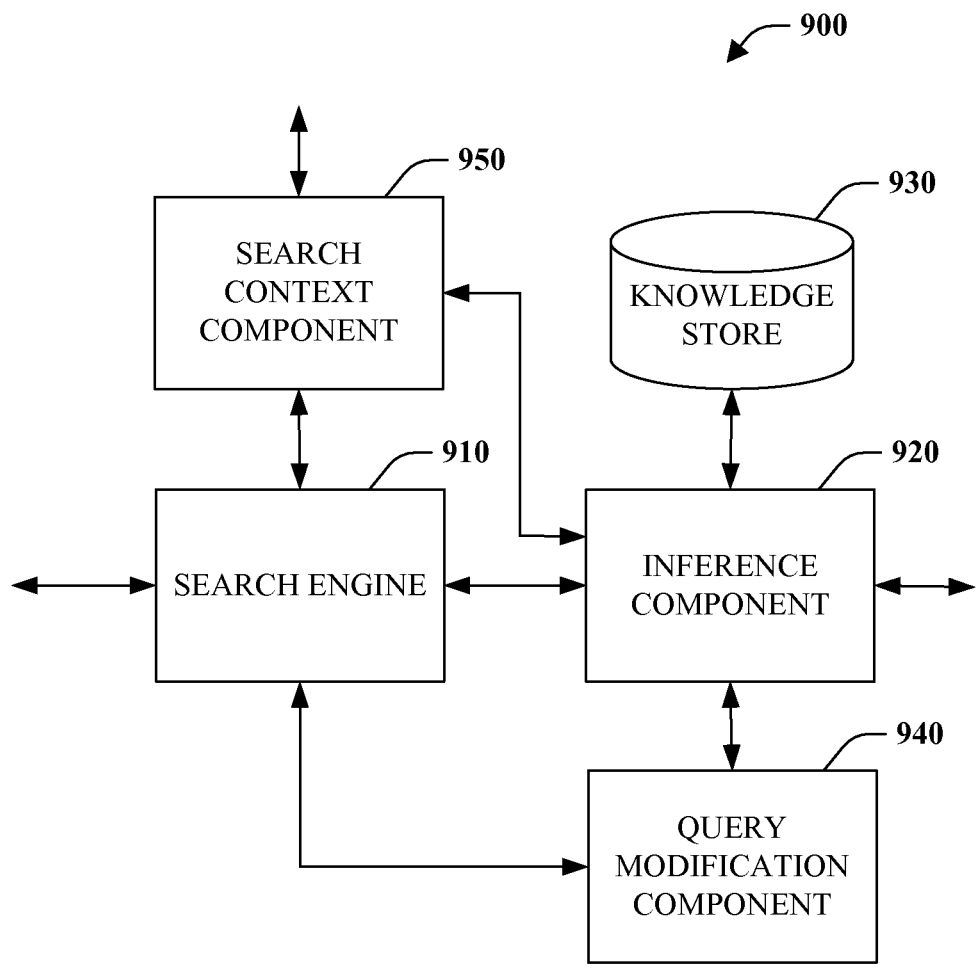
FIG. 9 is a block diagram of a web search system.

Referring to FIG. 9, a web search system 900 is illustrated in accordance with an aspect of the subject innovation. The search system 900 provides for web searching that is guided by heuristics and/or context information. The system includes a search engine 910. As is known in the art, the search engine 910 can receive queries and provide relevant results in response thereto. The search engine 910 is communicatively coupled to the inference component 920. In operation, the interface component 920 is able to guide search queries and results based in part upon heuristics and user supplied information, among other things. The inference component 920 can interact with a knowledge store 930 to facilitate inferring relevant search results. For example, the knowledge store 930 can include a plurality of knowledge capturing rules. The inference component 920 can employ one or more of these rules to guide and ultimately facilitate retrieval of more relevant results. In particular, the inference component 920 can request and retrieve, or simply receive, information and, based on the rules, facilitate query augmentation. For example, the inference component 920 can present a series of questions to a user regarding a search and return relevant results based on the answers. More specifically, a search query for "cars" could be met with questions regarding the type, style and/or brand, which can then initiate another series of questions to define further what is attempted to be located. Subsequent questions can therefore by dependent upon answers to previous questions. Accordingly, it is to be appreciated that together interference component 920 and knowledge base 930 can form at least part of a machine learning and reasoning system, although the innovation is not limited thereto.

In accordance with an aspect of the innovation, the inference component 920 (or expert system) can facilitate navigation of a topic hierarchy or cluster. For example, the search domain can be classified as a search tree where broader topics are toward the top and more granular topics are pushed toward the bottom. By way of example, a portion of the tree can include automobiles toward the top which are further broken down into cars, trucks, vans and the like where each one of these topics is further defined such as convertible cars, sports cars, etc. Additionally or alternatively, a cluster of topics can be utilized based on their relations. The inference component can utilize the original search terms as well as other context information, as described below, to locate a starting point within the tree or cluster. Questions and answers can then be employed together with the original query and context information to navigate the tree or cluster.

Query modification component 940 can receive information from the communicatively coupled inference component 920. The query modification component 940 is operable to alter the query provided to search engine 910 to reflect inferred information. This amended or new query can then be executed by search engine 910 to return relevant data. This process can be performed every time information is provided to the inference component 920 or at any other interval. In one instance, the query modification component 940 can utilize the topic hierarchy or cluster and current position therein to determine how the query should be modified. Furthermore, the modification component 940 can take advantage of domain and classification knowledge to generate queries that may not be intuitive to a user. In addition, the modification component 940 can generate queries that take advantage of the full expressive power of the query language supported by the search engine 910. In this manner, queries can be refined with tight control to zero in on a topic of interest. This will dramatically improve results and the efficiency with which such results are obtained, especially with respect to typical user queries that utilize a few keywords and maybe a conjunction or two. Novice users will thus be able to search with the same skill as a professional searcher or search advisor.

It should also be noted that system 900 includes a search context component 950 communicatively coupled to both the search engine 910 and the inference component 920. The context component 950 is operable to determine or retrieve context information relating to a search. The context information can be manually entered by a user and/or determined or inferred from user interaction (e.g., gender, age, favorite web pages . . . ). Still further yet, the context information can be received or determined from outside sources (e.g., day of week, holiday, weather, current events . . . ). The context information can be provided to inference component 110, which can guide a search based at least in part thereon. In one scenario, instead of presenting a question to a user to answer, the answer can be provided by the context information automatically. Hence, the user need only be asked questions the answers of which cannot be determined within a threshold degree of confidence based on current information.

More specifically, statistical machine learning and reasoning methods can be used to infer utilities of different outcomes, to infer a set of likelihoods about states of relevance to the goal of providing the user with a valuable search results, and also to infer the likelihoods about the outcomes of the answers to different questions that a user may be asked. Such information can be employed to compute the expected value of information associated with each potential dialog action, that is, the value of acquiring different inputs from user's or from systems about goals, demographics, or other information. The computation of such value of information can be used to triage and to limit questions asked of the user or drawn from a database. Such computations can consider sequences via lookahead or question clustering approaches, or can be used in a greedy, sequential manner to generate questions of the user, whereby likelihoods are updated with each response.

Figure 10:
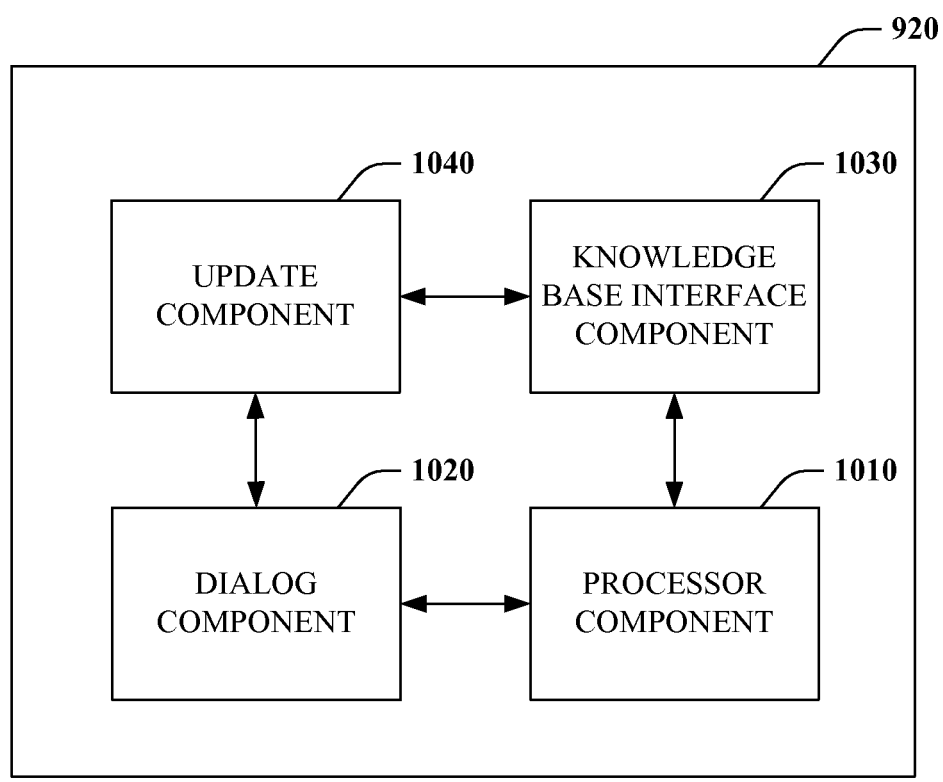
FIG. 10 is block diagram of an inference component.

FIG. 10 depicts an exemplary inference component 920 in accordance with an aspect of the innovation. In particular, the inference component 920 includes processor component 1010, dialog component 1020, knowledge base interface 1030, and update component 1040. The processor component 1010 processes information with respect to the dialog component 1020 and the interface component 1030. The dialog component 1020 generates questions that are provided to a user via the search engine or associated interface and receives answers thereto. Processor component dictates the questions that are generated and processes the received information. More specifically, the processor component 1010 can retrieve heuristics or rules (e.g., capturing a topic hierarchy or cluster(s)) from a knowledge store via knowledge store interface component 1030. These rules can determine and/or influence the questions provided by dialog component 1020 and the information required to infer what a user is looking for or what he/she would be interested in. The update component 1040 is communicatively coupled to the dialog component 1020 and the interface 1030 and is operable to monitor dialog interactions, among other things, and update the knowledge base via interface 1030. Over time this can enable the interface component 120 to learn and interact with a user with a more targeted or personalized dialog. In this manner, less information may be needed to receive relevant information. Furthermore, the update component 1040 can also facilitate suggesting searches that would be of interest to a user.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 11-17. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or media.

Figure 11:
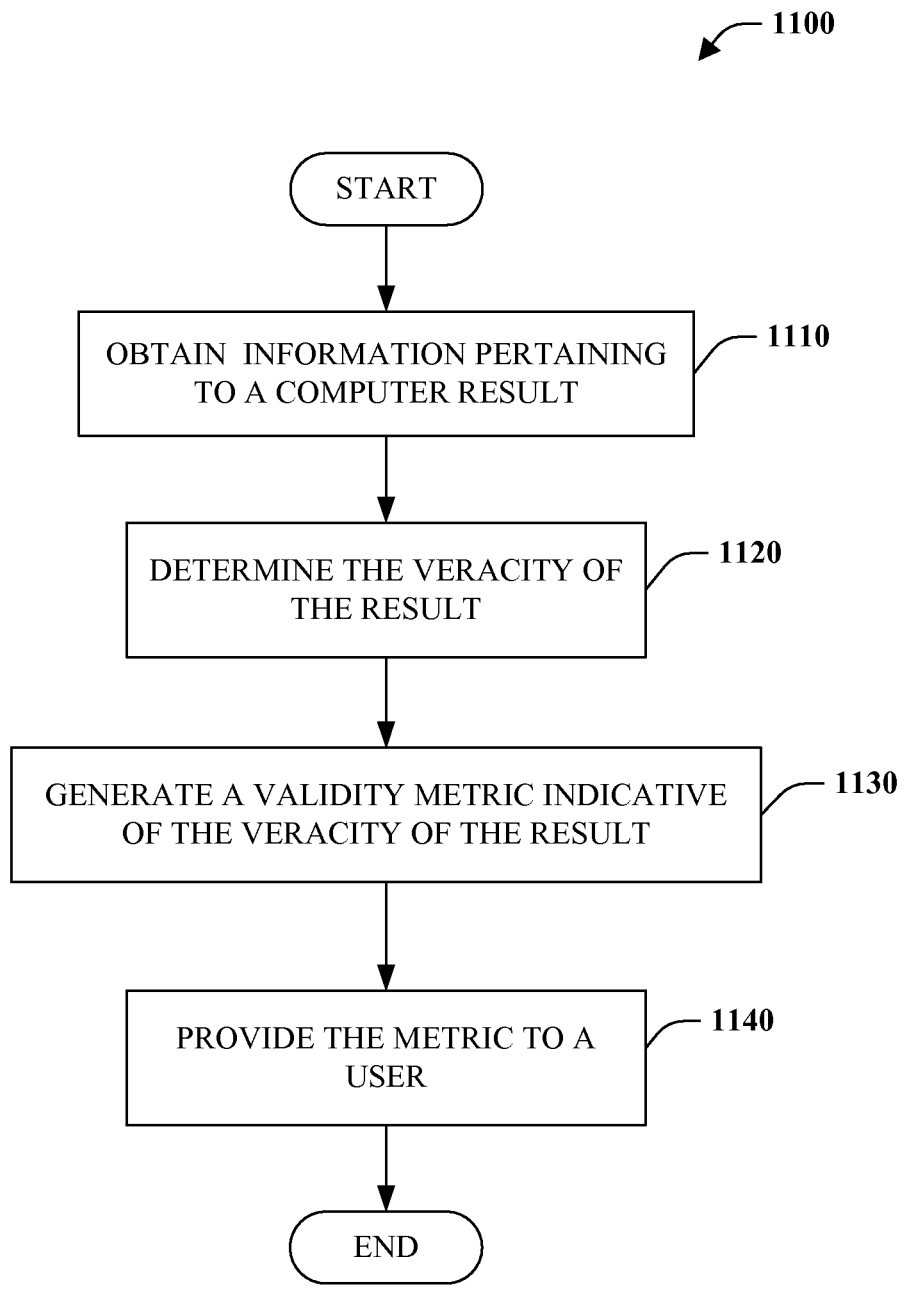
FIG. 11 is a flow chart diagram of a method of validating computer provided/generated data.

Referring to FIG. 11, a method 1100 of validating computer generated and/or provided data is illustrated in accordance with an aspect of the subject innovation. At reference numeral 1110, information pertaining to a computer result is obtained. For example, the result can correspond to an analysis of data or a retrieved web page. At numeral 1120, the veracity of the result is determined in one or more of a myriad of disparate manners (e.g., referral, survey, analysis . . . ). At reference numeral 1130, veracity metric is generated that is indicative of the veracity of the result. The metric can be compiled from one or more veracity measurements. Further the metric can be Boolean, such as true or false or alternatively scalar such a true, likely true, likely false, false. At reference numeral 1140, the metric can be provided to a user, for example alone or in conjunction with the results.

Figure 12:
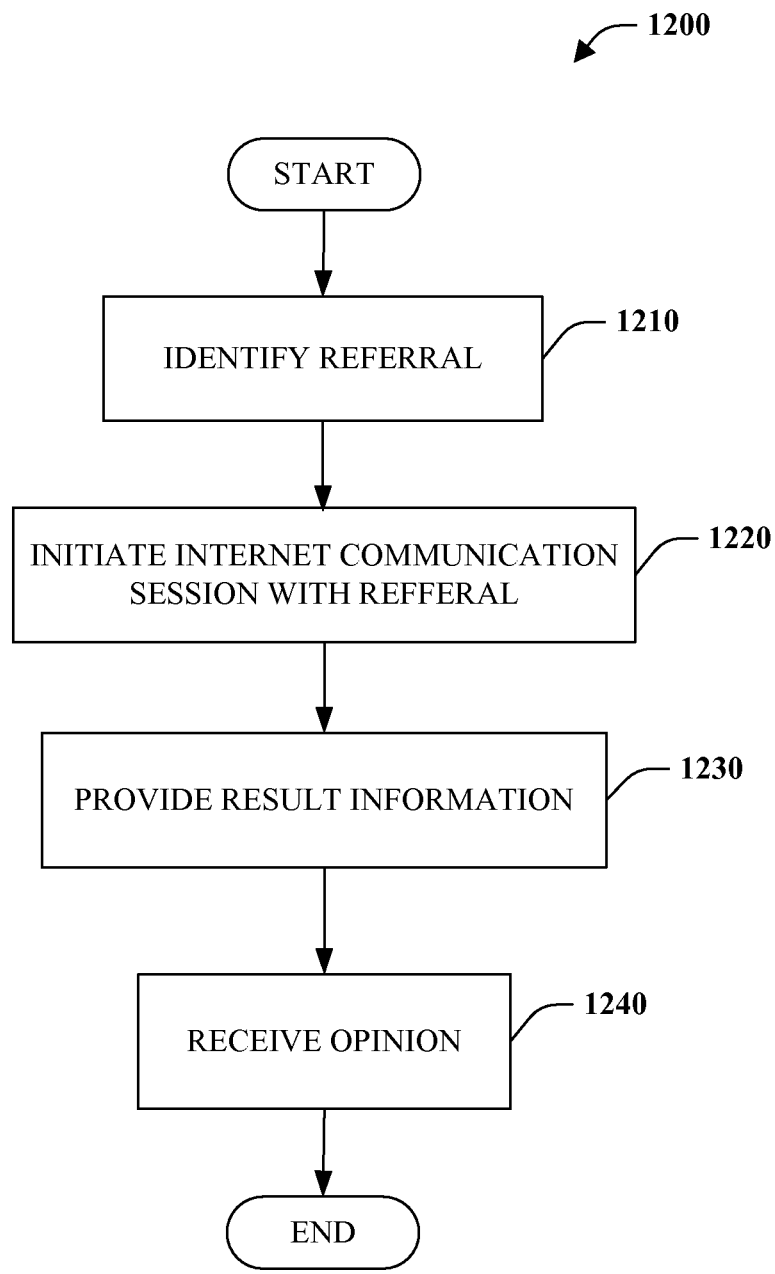
FIG. 12 is a flow chart diagram of a method of validating data utilizing referrals.

Turning attention to FIG. 12, a method 1200 of validating data is illustrated in accordance with an aspect of the innovation. More specifically, the method 1200 facilitates validation by one or more referrals. At reference numeral 1210, a referral is identified. The referral can be a known or user identified trusted individual. Further, this individual can be a subject matter specific referral such that a medical doctor is not identified as a referral relating to bridge construction, for example.

At reference 1220, an Internet communication session is initiated with one or more referrals to facilitate transfer of information. The session could be a secure web page, chat session, teleconference, and/or video conference, among other things. Additionally or alternatively, the session can simply correspond to an email message or thread thereof.

Result information is provided to one or more references via the communication session, at reference numeral 1230. The result information can include data that was employed to generate or provide a result and/or the result itself. For example, the result information can be data that is utilized to generate a result such EKG data. In such an instance, it may be desirable to provide only the result information so as not to bias the evaluation. In other instances, the result can be the information validation of which is of interest such as a web page. Accordingly, providing the result is important in this case.

At reference numeral 1240, one or more referral opinions are received via the communication session or other medium. As mentioned, the opinion can be the result itself if not originally provided. Alternatively, the opinion can relate to the veracity and or validity of the result provided result, given for instance the information utilized to determine the result.

Figure 13:
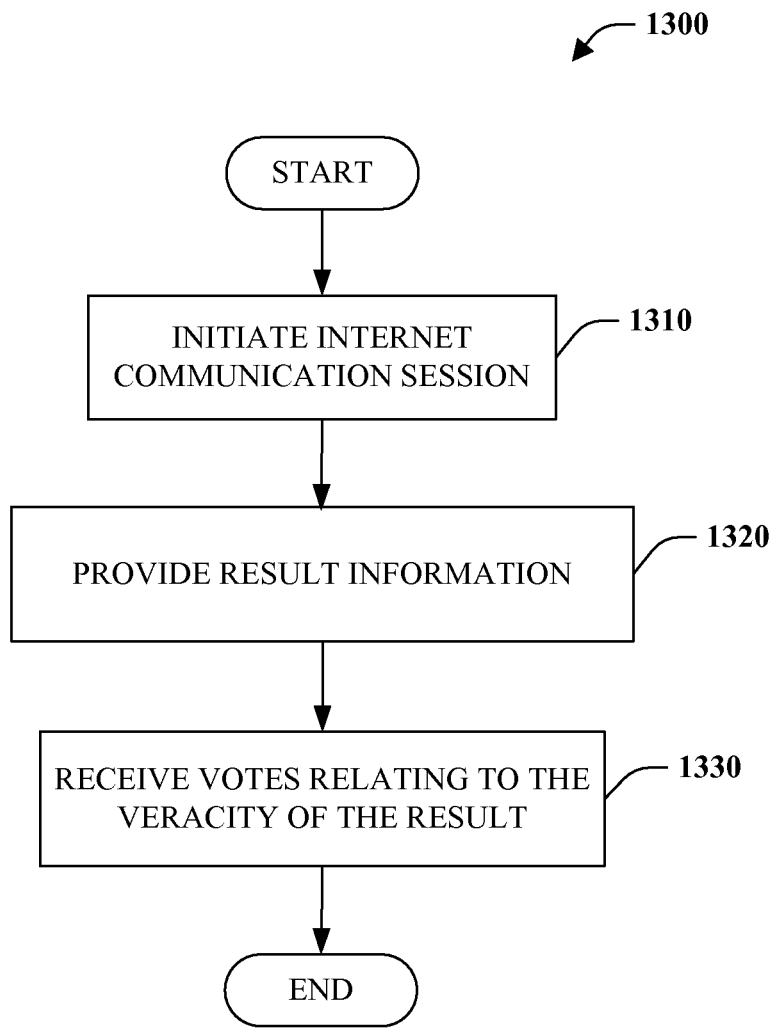
FIG. 13 is a flow chart diagram of a method of validating data utilizing polling.

FIG. 13 depicts a polling or survey method 1300 of validating data in accordance with an aspect of the subject innovation. At reference numeral 1310, an Internet communication session is initiated. The session can be a web page, a blog, a chat session, a teleconference and/or a video conference, among other things. At 1320, result information and/or the result itself is provided via the Internet communication session. Votes are received relating to the veracity of the result from the communication session. By way of example, a webpage or blog can be established within a social network identifying a webpage the veracity of which is questioned. The social network webpage can receive votes and/or opinions with respect to the truthfulness of the other page content.

Figure 14:
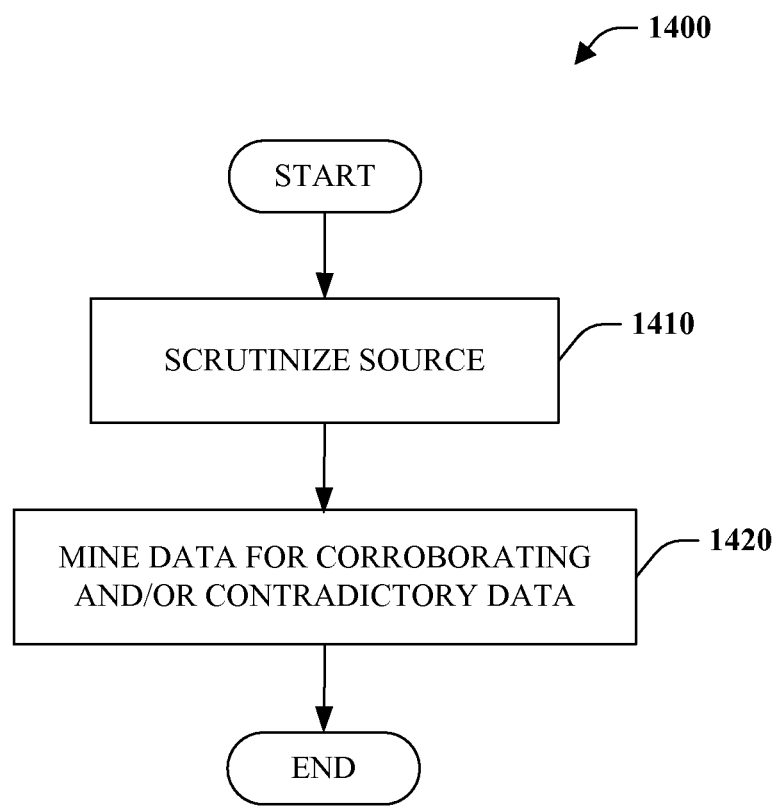
FIG. 14 is a flow chart diagram of an analytical validation method.

While human beings can be utilized to validate data, such a process can also be automated. FIG. 14 illustrates an analytical method 1400 of validating data in accordance with an aspect of the subject innovation. At reference numeral 1410, the data source can be scrutinized. In other words, the trustworthiness of the source (e.g., type, specific source . . . ) is investigated. By way of example, data provided on a personal webpage can be identified as less trustworthy than that associated with a commercial online encyclopedia. In a simple implementation, sources and associated values can be housed in a database and scrutinizing the source can comprise identifying the source and looking up a value associated therewith. Such measures of trustworthiness can also be updated at intervals to ensure accurate values. At reference numeral 1420, data can be mined for corroborating and/or contradictory data. For example, if a fact is asserted, a plurality of data sources can be located and analyzed to determine the veracity of the asserted fact.

Figure 15:
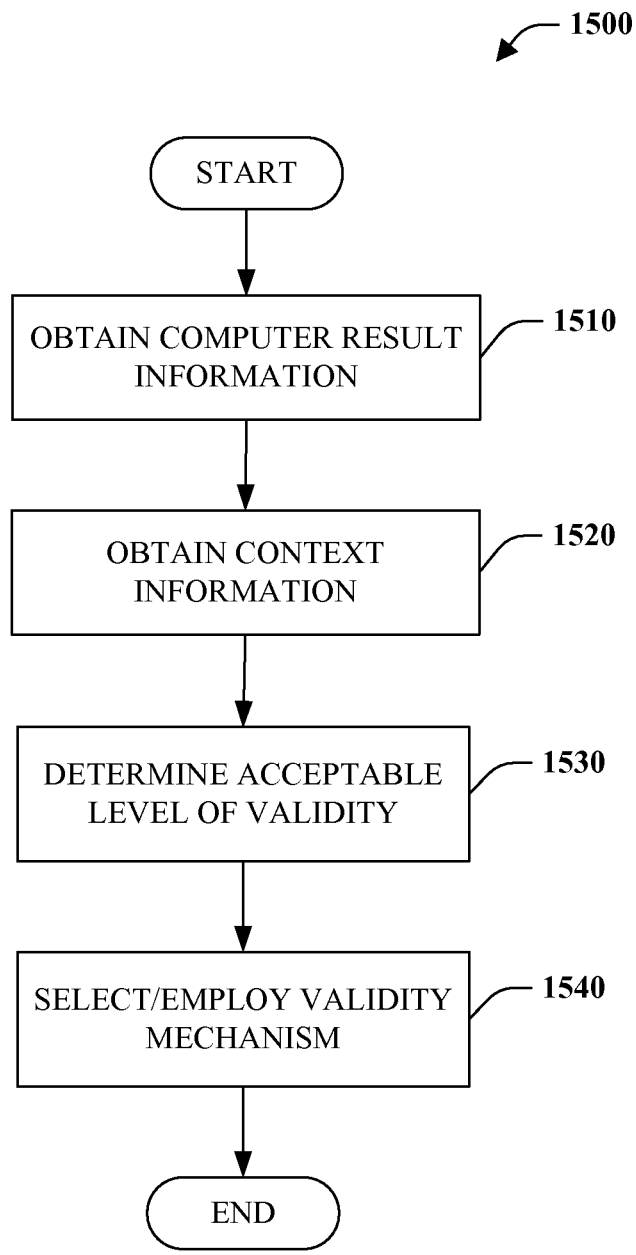
FIG. 15 is a flow chart diagram of a method of validating computer data.

Referring to FIG. 15, validation method 1500 is shown in accordance with an aspect of the innovation. At reference numeral 1510, computer result information sought to be validated is obtained. Context information surrounding the data to be validated, amongst other things, is obtained. For example, context information can pertain to the individual or entity requesting validation and the kind or type of data being validated (e.g., banking, medical, personal, pleasure . . . ), among other things. At reference numeral 1530, an acceptable level of validity is determined given the information to be validated and the context. For instance, if what is attempted to be validated were medical data by a doctor, the acceptable level of validity would be quite high, especially with respect a date and location of a sporting event by an enthusiast. At numeral 1540, one or more validity mechanisms are selected and employed based a specified level of validity. In the medical information example, this could correspond to a referral mechanism that enables another doctor review the data. For the sports data, a polling and/or data analysis mechanism may be deemed appropriate.

Figure 16:
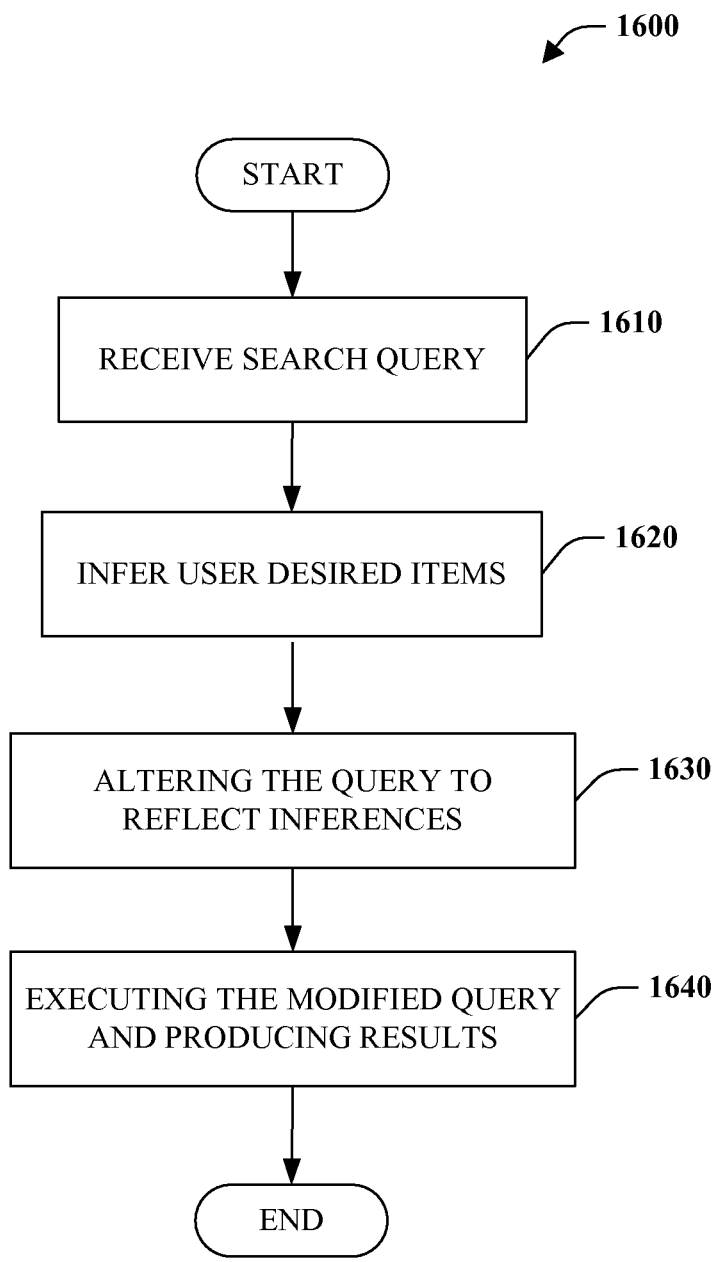
FIG. 16 is a flow chart diagram of a search methodology.

FIG. 16 illustrates a search methodology 1600 in accordance with an aspect of the subject innovation. At reference numeral 1610, a search query is received such as a web search via a search engine. Inferences are made pertaining to possible desired items at 1620. Such inferences can be made based on one or more of heuristics and context information. For example, if it can be determined from heuristics or context that an individual is interested in black sport utility vehicles (SUVs). At numeral 1630, the search query is modified based on the inferences thereby specifying more relevant data. As per the above example, query for cars or trucks could be modified to focus the query on black SUVs. At reference numeral 1640, the modified query is executed and results returned.

Figure 17:
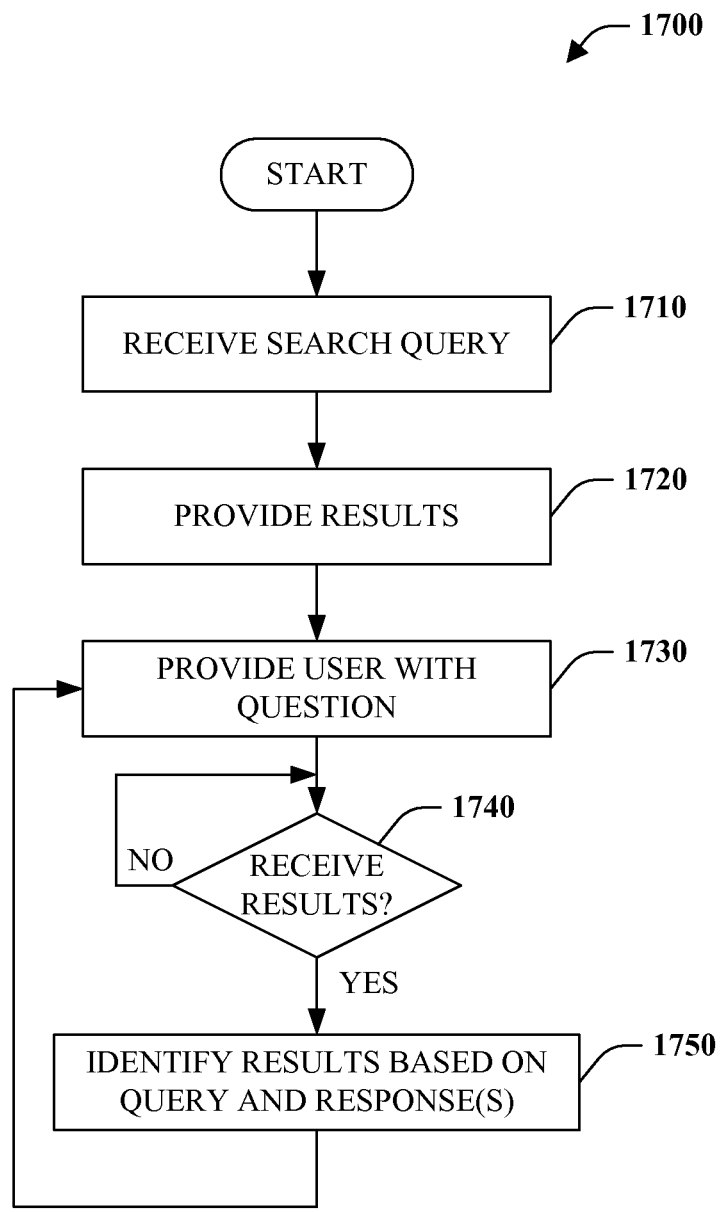
FIG. 17 is a flow chart diagram of a guided search method.

FIG. 17 illustrates a flow chart diagram of a method 1700 of web searching in accordance with an aspect of the subject innovation. At reference numeral 1710, a search query is received. Results generated from execution of the query are provided at 1720. Up to this point, the method 1700 may correspond to a process performed by a conventional search engine. However, at reference numeral 1730, a user is provided with a question pertaining to their query.

The question can be targeted to solicit information to further define a query or a category of search. For example, if a query for "Saturn" is entered, a question could be generated such as "Are you looking for 'Saturn' the car or 'Saturn' the planet?" While questions can be asked in such an open fashion, answers may also be solicited based on "yes" and "no" questions. For instance, "Are you referring to 'Saturn' the planet?" If the answer is 'no', it can automatically infer you are referring to the car and/or generate another question to confirm. Further, it should be appreciated that questions can also be guided by context. Accordingly, the initial question asking whether you are referring to the planet can be intelligently selected based on context information pertaining to planets, astrology or the like identified from preferences, previous searches, and current events, among other things.

Still further yet, the determination to ask a question and/or the question itself can be based on an expectancy value or value of information (e.g. incorporating utilities of different outcomes, likelihoods about state of relevance to goal of providing relevant results, likelihoods of outcomes of answers to different questions that may be asked . . . ) indicating that it would be best to retrieve such an answer rather than to retrieve from user information or context and/or to infer such an answer. Questions can be generated when the information value exceeds a threshold.

At numeral 1740, a determination is made as to whether a result or answer is received in response to the provided question. If no, the method continues to loop at 1740. If yes, the method proceeds to numeral 1750 where results are identified based on the query and one or more responses. For example, the query can be qualified based on received answers to questions. The method can continue at 1730 where another question is provided to a user. This question can be based on both the query and/or the previous response. The method can then continue to loop to further define a query and therefore result granularity. In this manner, a search can be guided, intelligently perhaps, by questions and responses thereto.

In one instance, the questions and answers can automate navigation of a topic classification hierarchy or cluster. Additionally, a classification hierarchy or cluster can be provided with results to enable users to further refine or broaden their searches (e.g. rollup, drop down), if desired. Furthermore, it is to be noted that results need not be provided until a particular knowledge threshold is met. In other words, search results need not be provided until the search as been refined to a certain extent, for example based on the resultant number of matches or the like.

As used in herein, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Artificial intelligence based systems (e.g. explicitly and/or implicitly trained classifiers) can be employed in connection with performing inference and/or probabilistic determinations and/or statistical-based determinations as in accordance with one or more aspects of the subject innovation as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g. hard disk, floppy disk, magnetic strips . . . ), optical disks (e.g., compact disk (CD), digital versatile disk (DVD) . . . ), smart cards, and flash memory devices (e.g., card, stick, jump drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 18:
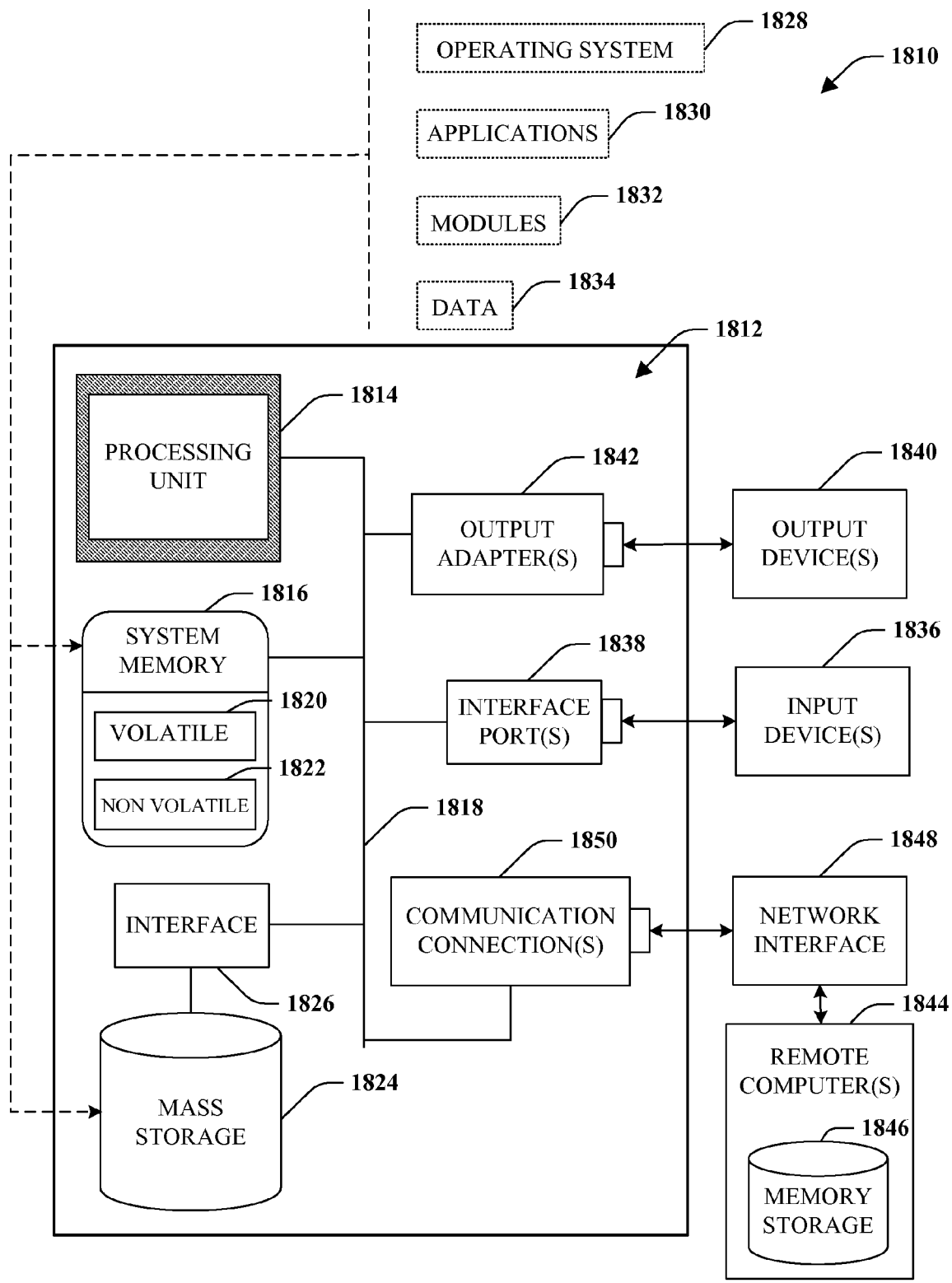
FIG. 18 is a schematic block diagram illustrating a suitable operating environment for aspects of the subject innovation.
Figure 19:
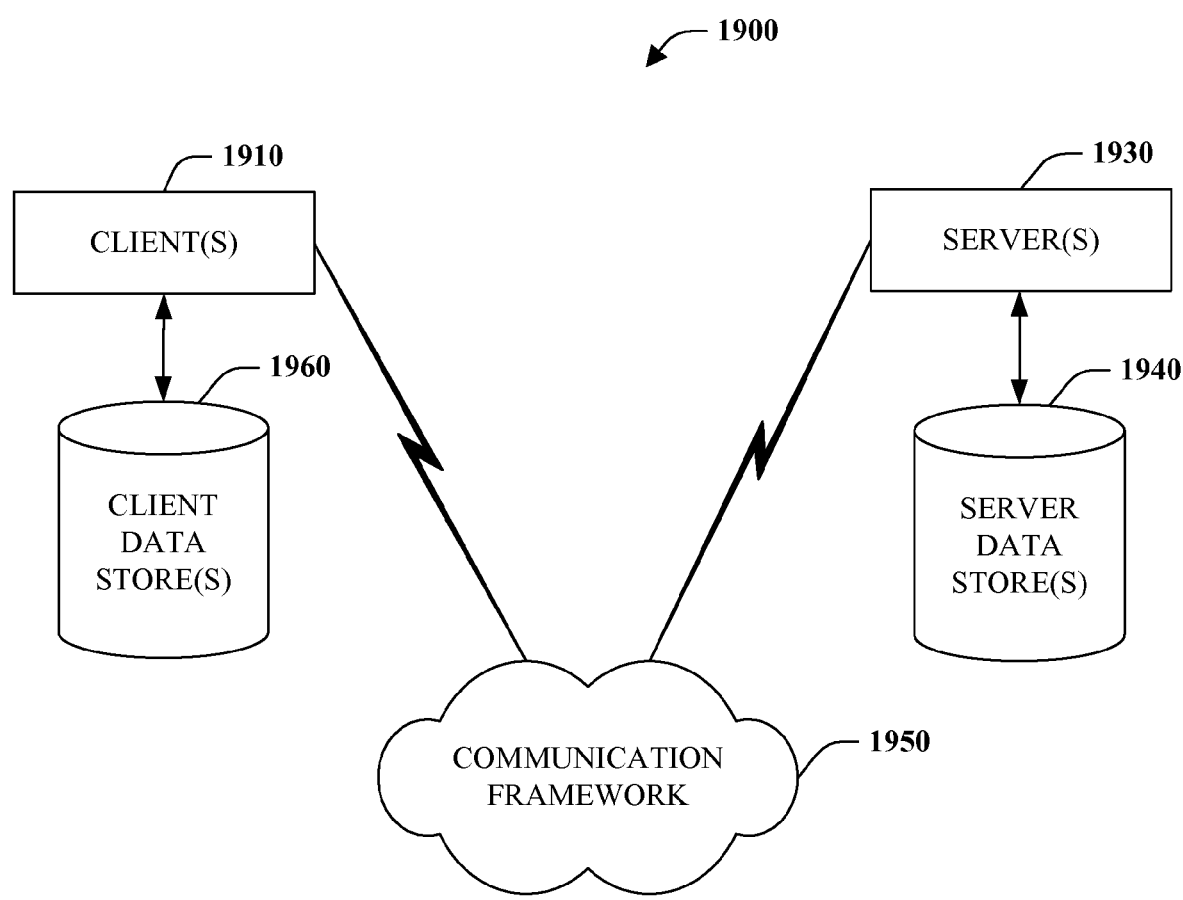
FIG. 19 is a schematic block diagram of a sample-computing environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 18, an exemplary environment 1810 for implementing various aspects disclosed herein includes a computer 1812 (e.g., desktop, laptop, server, hand held, programmable consumer or industrial electronics . . . ). The computer 1812 includes a processing unit 1814, a system memory 1816, and a system bus 1818. The system bus 1818 couples system components including, but not limited to, the system memory 1816 to the processing unit 1814. The processing unit 1814 can be any of various available microprocessors. Dual microprocessors and other multiprocessor architectures (e.g., multi-core) also can be employed as the processing unit 1814.

The system bus 1818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory.

Computer 1812 also includes removable/non-removable, volatile/non-volatile computer storage media. FIG. 18 illustrates, for example, mass or auxiliary storage 1824. Mass storage 1824 includes, but is not limited to, devices like a magnetic disk drive, floppy disk drive, tape drive, Jaz drive, Zip drive, LS-100 drive, flash memory card, or memory stick. In addition, mass storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on mass storage 1824 and loaded to system memory 1816, acts to control and allocate resources of the system 1812. System applications 1830 take advantage of the management of resources by operating system 1828 through program modules 1832 and program data 1834 stored either in system memory 1816 or on mass storage 1824. It is to be appreciated that the subject innovation can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812 and to output information from computer 1812 to an output device 1840. Output adapter 1842 is provided to illustrate that there are some output devices 1840 like displays (e.g., flat panel, CRT, LCD, plasma . . . ), speakers, and printers, among other output devices 1840 that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected (e.g. wired or wirelessly) via communication connection 1850. Network interface 1848 encompasses communication networks such as local-area networks (LAN) and wide-area networks (WAN).

Communication connection(s) 1850 refers to the hardware/software employed to connect the network interface 1848 to the bus 1818. While communication connection 1850 is shown for illustrative clarity inside computer 1816, it can also be external to computer 1812. The hardware/software necessary for connection to the network interface 1848 includes, for exemplary purposes only, internal and external technologies such as, modems including regular telephone grade modems, cable modems, power modems and DSL modems, ISDN adapters, and Ethernet cards or components.

FIG. 19 is a schematic block diagram of a sample-computing environment 1900 with which the subject innovation can interact. The system 1900 includes one or more client(s) 1910. The client(s) 1910 can be hardware and/or software (e.g., threads, processes, computing devices). The system 1900 also includes one or more server(s) 1930. Thus, system 1900 can correspond to a two-tier client server model or a multi-tier model (e.g., client, middle tier server, data server), amongst other models. The server(s) 1930 can also be hardware and/or software (e.g., threads, processes, computing devices). The servers 1930 can house threads to perform transformations by employing the subject innovation, for example. One possible communication between a client 1910 and a server 1930 may be in the form of a data packet transmitted between two or more computer processes.

The system 1900 includes a communication framework 1950 that can be employed to facilitate communications between the client(s) 1910 and the server(s) 1930. The client(s) 1910 are operatively connected to one or more client data store(s) 1960 that can be employed to store information local to the client(s) 1910. Similarly, the server(s) 1930 are operatively connected to one or more server data store(s) 1940 that can be employed to store information local to the servers 1930.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A web search system comprising:
   a memory;
   a processing unit coupled to the memory, the processing unit configured to execute computer-implemented components comprising:
   a search engine that receives search queries and identifies web pages relevant to the search queries;
   an inference component that infers web page information relevant to a current search query by generating one or more questions, initiating a communication session to communicate the one or more questions to a user, and receiving one or more user supplied answers from the user to the one or more questions via the communication session, the inference component further modifies a heuristic rule pertaining to a search domain classified by a topic hierarchy or a topic cluster based on knowledge learned from the inferred web page information associated with the one or more user supplied answers to generate a modified heuristic rule; and
   a query modification component that alters the current search query based at least on the inferred webpage information, the modified heuristic rule, and a navigated position in the topic hierarchy or the topic cluster.

2. The system of claim 1, wherein the inference component comprises a dialog component that generates the one or more questions and receives the one or more user supplied answers.

3. The system of claim 1, wherein the inference component comprises a processor component that processes the one or more user supplied answers using heuristics associated with a search query refinement technique.

4. The system of claim 1, further comprising at least one component that adds or deletes heuristics based at least on interaction with the search engine.

5. The system of claim 3, wherein the heuristics are specific to a subset of web pages that define the topic hierarchy or the topic cluster.

6. The system of claim 3, wherein the heuristics are encapsulated by predicate logic rules.

7. The system of claim 3, wherein the processor component processes the one or more user supplied answers using context information associated with previously received user supplied answers.

8. The system of claim 1, wherein the query modification component initiates an altered search query that is associated with, but different from, the current search query.

9. The system of claim 1, further comprising a context component that acquires context information associated with a particular search query and provides the context information that is acquired to the inference component.

10. The system of claim 1, wherein the navigated position in the topic hierarchy or topic cluster represents a position in the topic hierarchy or topic cluster to which the inference component has previously navigated during an execution of one or more original search queries or one or more altered search queries.

11. A computer-readable storage device having computer-executable instructions encoded thereon, which when executed at a computer, cause the computer to perform operations comprising:
   receiving and processing one or more web queries;
   navigating a search domain classified by a topic cluster based at least on the one or more web queries;
   refining the one or more web queries iteratively via user interaction with a machine learning and reasoning system employing the topic, wherein the topic cluster represents relationships between topics associated with the one or more web queries, and
   wherein the user interaction with the machine learning and reasoning system comprises:
   inferring items of interest by generating one or more questions and receiving one or more user answers from one or more users to the one or more questions;
   modifying a heuristic rule pertaining to the search domain classified by the topic cluster based at least on knowledge learned from the inferring the items of interest using the one or more user answers provided by the one or more users to the one or more questions to generate a modified heuristic rule; and
   modifying one or more of the web queries to generate a modified query based at least on the items of interest, the modified heuristic rule, and a navigated position in the topic cluster.

12. The computer-readable storage device of claim 11, wherein the operations further comprise altering a knowledge base associated with the machine learning and reasoning system based on the user interaction with the machine learning and reasoning system.

13. The computer-readable storage device of claim 11, wherein the one or more questions are generated based on one or more previous web queries and current events.

14. A web query refinement method comprising the following computer-implemented acts:
   receiving a search query;
   navigating a search domain classified by a topic hierarchy or a topic cluster based on the search query;
   inferring items of interest by generating a series of one or more questions and receiving answers to the series of one or more questions from a particular user;
   modifying a heuristic rule pertaining to the search domain classified by the topic hierarchy or the topic cluster based at least on knowledge learned from inferring the items of interest using the answers received from the particular user for the series of one or more questions to generate a modified heuristic rule; and
   modifying the search query to generate a modified search query based at least on the items of interest, the modified heuristic rule, and a navigated position in the topic hierarchy or the topic cluster.

15. The method of claim 14, further comprising executing the modified search query to generate query results.

16. The method of claim 14, further comprising:
   computing a value of information based on a set of inferred likelihoods of receiving different answers from one or more users, and based on receiving context information about the one or more users; and
   generating the series of one or more questions when the value of information that is computed breaches a threshold.

17. The method of claim 14, further comprising generating the series of one or more questions based on previously received user answers.

18. The method of claim 16, further comprising inferring the items of interest from the context information about the one or more users.

19. The method of claim 15, further comprising identifying multiple users to verify a veracity of a query result generated from the modified search query, each user of the multiple users verifying a portion of the query result that corresponds to the each user.

* * * * *